No. 692,018. Patented Jan. 28, 1902.
R. KNIETSCH.
APPARATUS FOR MAKING SULFURIC ANHYDRID.
(Application filed Oct. 25, 1899.)
(No Model.) 9 Sheets—Sheet 2.

No. 692,018. Patented Jan. 28, 1902.
R. KNIETSCH.
APPARATUS FOR MAKING SULFURIC ANHYDRID.
(Application filed Oct. 25, 1899.)
(No Model.) 9 Sheets—Sheet 3.

No. 692,018. Patented Jan. 28, 1902.
R. KNIETSCH.
APPARATUS FOR MAKING SULFURIC ANHYDRID.
(Application filed Oct. 25, 1899.)
(No Model.) 9 Sheets—Sheet 5.

Fig. 6,

No. 692,018. Patented Jan. 28, 1902.
R. KNIETSCH.
APPARATUS FOR MAKING SULFURIC ANHYDRID.
(Application filed Oct. 25, 1899.)

(No Model.) 9 Sheets—Sheet 6.

No. 692,018. Patented Jan. 28, 1902.
R. KNIETSCH.
APPARATUS FOR MAKING SULFURIC ANHYDRID.
(Application filed Oct. 25, 1899.)
(No Model.) 9 Sheets—Sheet 7.

No. 692,018. Patented Jan. 28, 1902.
R. KNIETSCH.
APPARATUS FOR MAKING SULFURIC ANHYDRID.
(Application filed Oct. 25, 1899.)
(No Model.) 9 Sheets—Sheet 8.

Fig. 13.

No. 692,018. Patented Jan. 28, 1902.
R. KNIETSCH.
APPARATUS FOR MAKING SULFURIC ANHYDRID.
(Application filed Oct. 25, 1899.)
(No Model.) 9 Sheets—Sheet 9.

Fig. 14.

WITNESSES: INVENTOR
Rudolf Knietsch
BY
ATTORNEYS.

UNITED STATES PATENT OFFICE.

RUDOLF KNIETSCH, OF LUDWIGSHAFEN, GERMANY, ASSIGNOR TO THE BADISCHE ANILIN & SODA FABRIK, OF LUDWIGSHAFEN, GERMANY, A CORPORATION OF BADEN.

APPARATUS FOR MAKING SULFURIC ANHYDRID.

SPECIFICATION forming part of Letters Patent No. 692,018, dated January 28, 1902.

Application filed October 25, 1899. Serial No. 734,710. (No model.)

*To all whom it may concern:*

Be it known that I, RUDOLF KNIETSCH, doctor of philosophy, a subject of the King of Prussia, German Emperor, residing at Ludwigshafen-on-the-Rhine, in the Kingdom of Bavaria and Empire of Germany, have invented new and useful Improvements in Apparatus for the Manufacture of Sulfuric Anhydrid, of which the following is a specification.

In an application, Serial No. 685,969, filed by me July 14, 1898, I have described a process for manufacturing sulfuric anhydrid by the contact method and the general features of apparatus adapted for that purpose. In the present application I set forth more specifically the features of an apparatus and means of utilizing the sulfuric anhydrid produced.

In the accompanying drawings.

A is the supply of $SO_2$.

Figure 1:
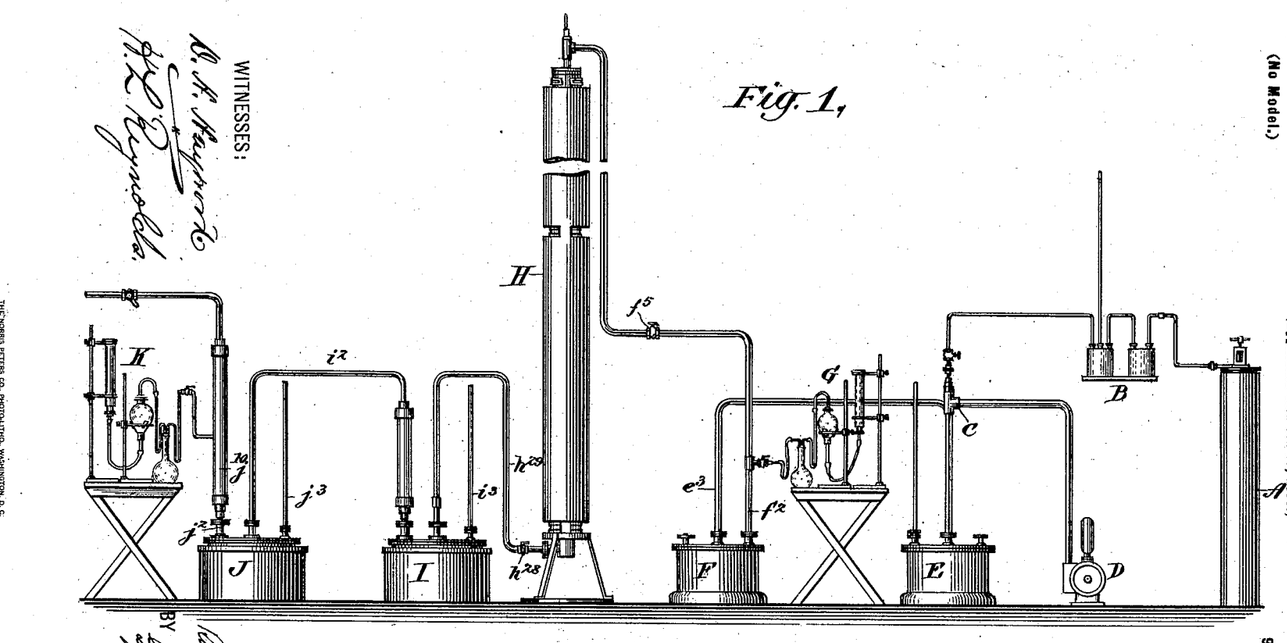
Figure 1 is a side view of the principal parts of such apparatus with the form of contact-furnace in which the cooling is done by a current of air.
Figure 2:
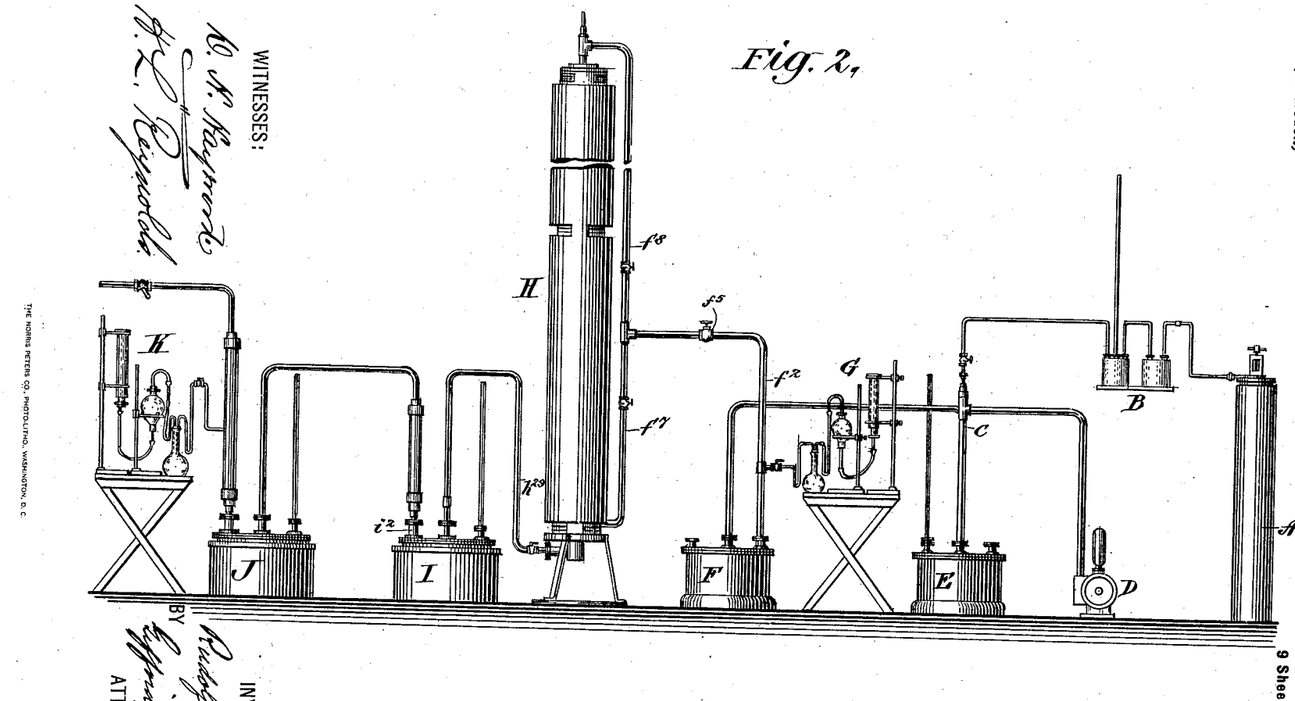
Fig. 2 is the same with the form of contact-furnace in which the current of gas on its way to the contact-chamber participates in the cooling.
Figures 3, 4:
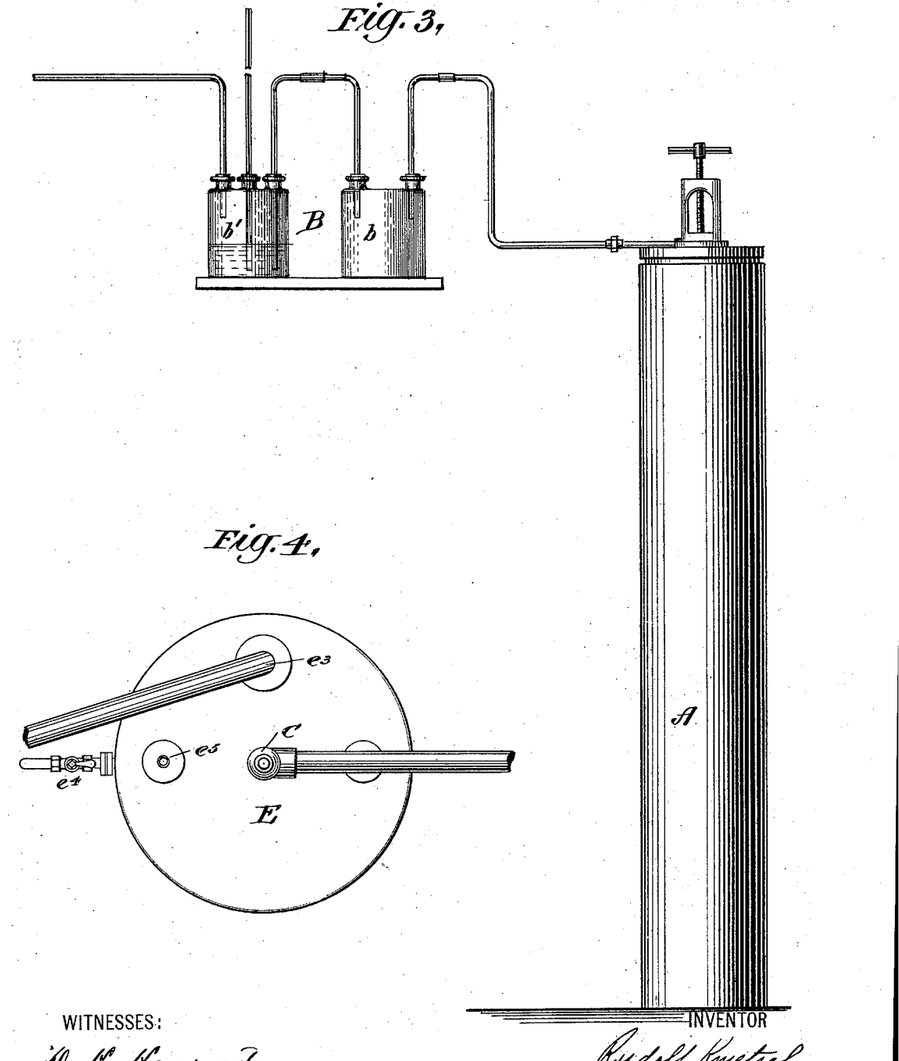
Fig. 3 is a detail of the supply of sulfur dioxid and the drying-train.
Fig. 4 is a plan view of the washer or purifier.

B is a drying-train whereby the sulfur dioxid is dried, consisting of the safety vessel $b$ and the drying vessel $b'$.

Figures 5, 15:
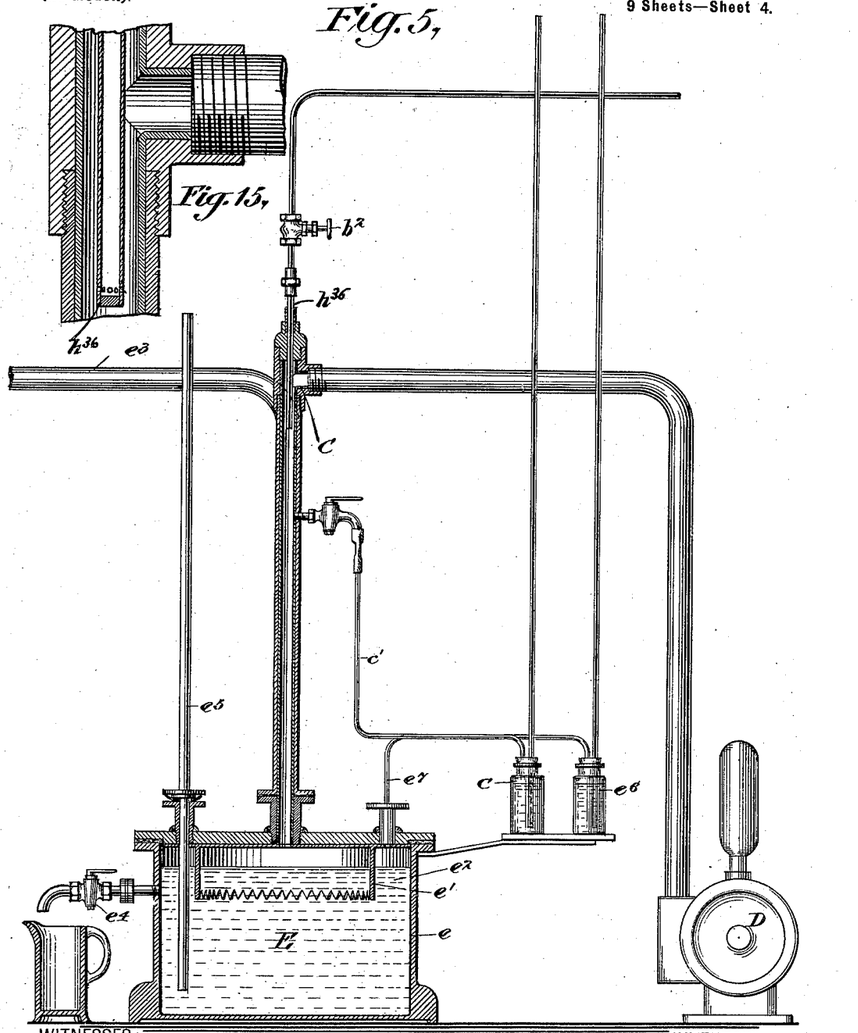
Fig. 5 is an elevation of the pump and of the mixer and washer in section.
Fig. 15 is a detail of the mixer C whereby the sulfur dioxid is mixed with the air supplied by the pump D and showing the inlet for the sulfur dioxid at the top and the inlet for the air at the side. The inner tube, which is connected with the sulfur-dioxid supply, is not open at the end, but closed, and the sulfur dioxid escapes through the small openings shown in the wall of the tube and near the end of the same.

C is a mixer whereby the sulfur dioxid is mixed with oxygen contained in air supplied from the air-pump D.

E is a washer whereby water and suspended material are washed out of the mixed sulfur dioxid and air.

Figure 6:
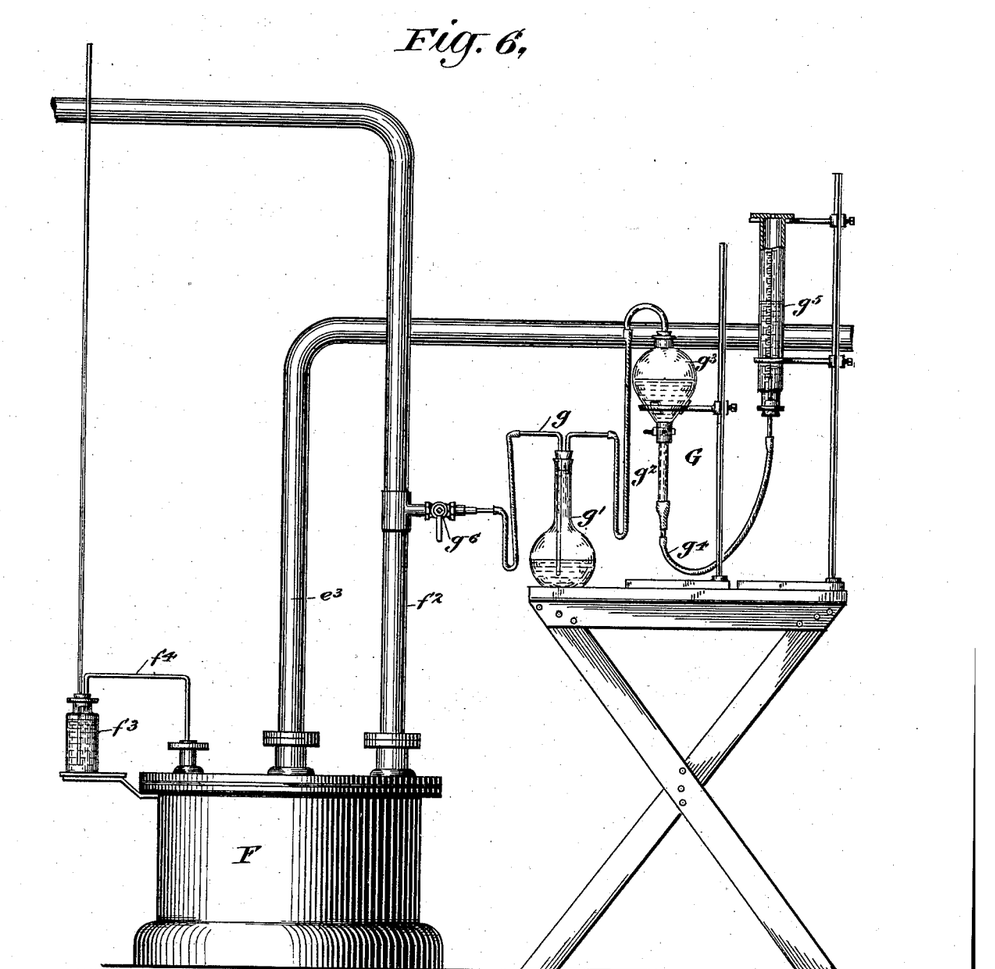
Fig. 6 is an elevation of the stripper and one of the testers.

F is a "stripper" wherein the mixed sulfur dioxid and air are stripped of or freed from sulfuric acid which has been carried over mechanically from the washer E.

G is a tester of ordinary construction, whereby the percentage of sulfur dioxid in the mixture of gases is ascertained by the method of Reich.

H is the contact-furnace wherein the mixed sulfur dioxid and oxygen of the air are combined to form sulfuric anhydrid.

Figure 13:
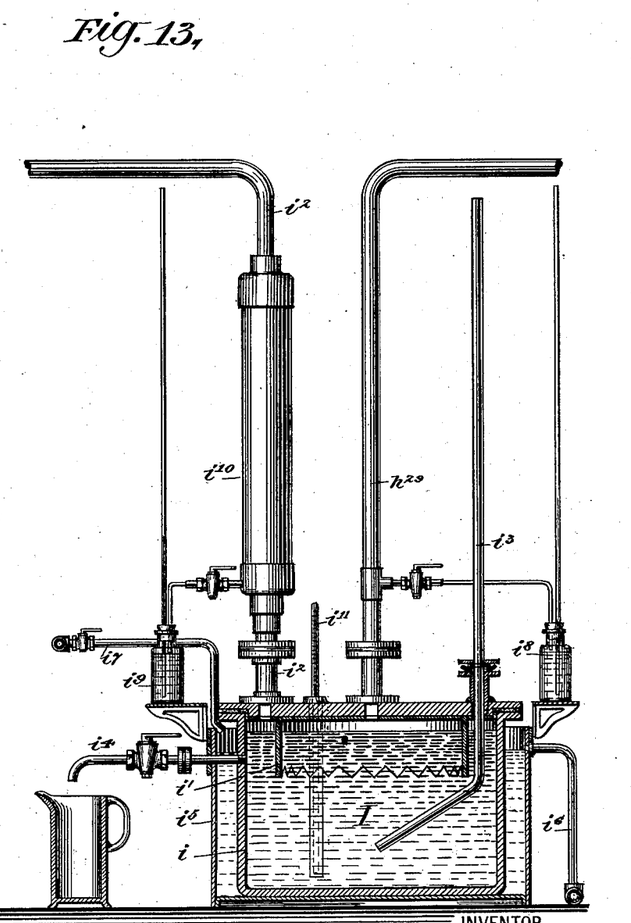
Fig. 13 is an elevation of the first absorber in section and of parts adjacent thereto.

I is the first absorber, wherein a portion of the sulfuric anhydrid is absorbed by sulfuric acid of 66° Baumé, so as to form fuming sulfuric acid.

Figure 14:
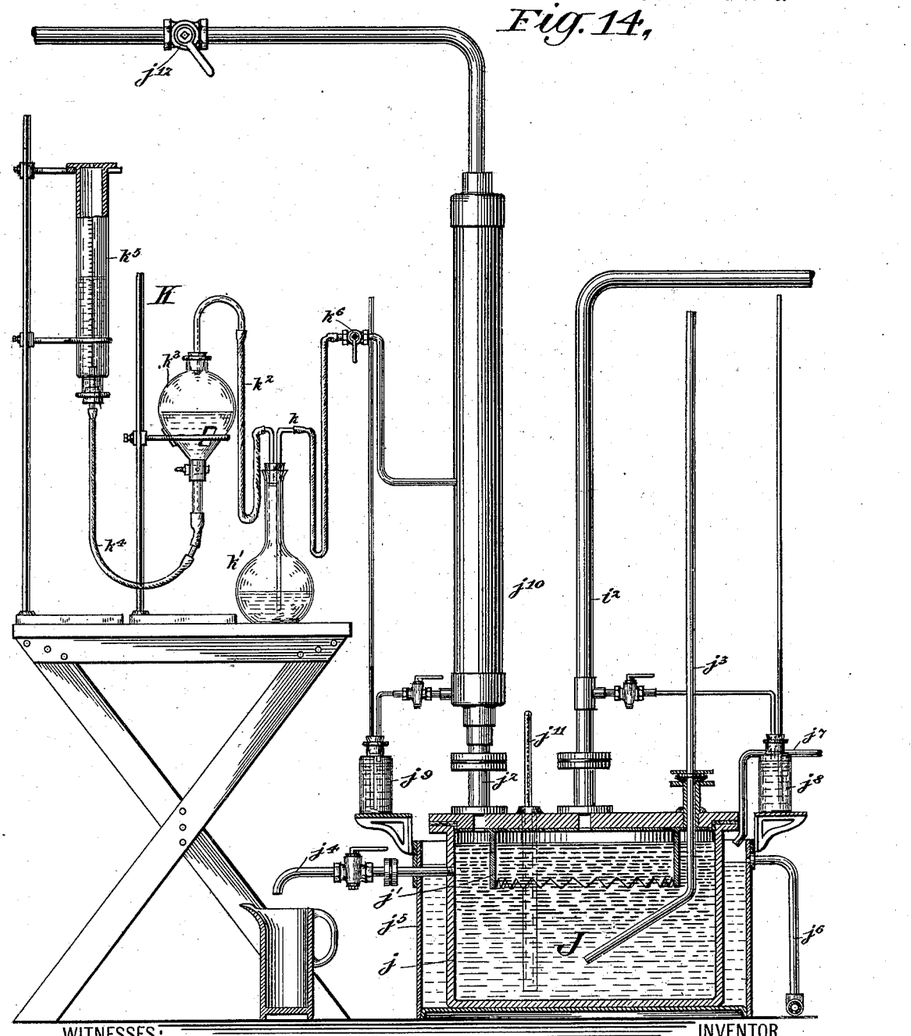
Fig. 14 is an elevation of the second absorber and of the parts adjacent thereto and of a tester.

J is the second absorber, wherein the sulfuric anhydrid unabsorbed in absorber I is led into sulfuric acid of 58° Baumé to form sulfuric acid of 66° Baumé.

K is the second tester, whereby the percentage of sulfur dioxid in the escaping gases is ascertained.

I will now proceed to describe so far as is necessary the different parts in detail. No detailed description of the parts A, B, C, or D is necessary, because they simply represent one means of obtaining a mixture of sulfur dioxid and air and in practical manufacturing operations would be supplanted by the ordinary pyrites-furnace apparatus, which is well known to persons skilled in the art, and a suitable purifying apparatus.

The washer E (which is shown drawn to scale in Figs. 4 and 5) consists of a lead inclosure $e$, suspended from the top of which is a lead hood $e'$, the lower edge of which is serrated and which extends about one-third the distance from the top to the bottom of the inclosure $e$. The hood $e'$ is of less diameter than the inclosure $e$, so as to leave an annular space $e^2$ around the periphery of the hood. The mixing-chamber C connects with the interior through the crown of the hood, as shown. The exit-pipe $e^3$ is a wrought-iron pipe and leads from the top of the inclosure $e$ at a point outside of the hood $e'$. In use the inclosure $e$ is supplied with sufficient sulfuric acid of 66° Baumé to immerse the lower edge of the hood $e'$ slightly above the teeth, and thus compel the gases passing from the mixing-chamber C to the exit-pipe $e^3$ to pass through the sulfuric acid contained in the receptacle $e$, so that the sulfuric acid may absorb the moisture and remove other suspended impurities contained in said gases. By having the lower edge of the hood serrated the teeth act to distribute the passing gases.

$e^4$ is a faucet through which the sulfuric acid when it has become too weak to act as an efficient drying agent may be drawn off, and $e^5$ is a stand-pipe through which sulfuric acid may be supplied and which performs the function of a safety-valve.

$c$ is a pressure-gage containing sulfuric acid to determine the pressure of the gas in the mixing-chamber C, with which it is connected by the pipe $c'$. $e^6$ is a pressure-gage containing sulfuric acid to determine the pressure of the gas as it is leaving the inclosure $e$, with which it is connected by the pipe $e^7$. A comparison of the readings of these two pressure-gages will enable the attendant to determine, approximately, the height of the column of sulfuric acid through which the gas is passing within the inclosure $e$.

The stripper F may consist of an inclosure and a hood suspended from the top thereof, each of which may be substantially of the same form, dimensions, and material as the corresponding parts of the washer E. The pipe $e^3$ enters the top of the hood through the crown thereof, and the exit-pipe $f^2$ is connected with the top of the inclosure outside of the hood. In use the inclosure is empty and serves as a pocket or trap where the sulfuric acid carried over from the washer E may deposit itself as the gas is passing under the edge of the hood.

$f^3$ is a pressure-gage by which the attendant can ascertain the pressure of the gas as it leaves the stripper F and which is connected with the top of the space in F outside the hood by the pipe $f^4$.

G is a testing apparatus for the determination of the percentage of sulfur dioxid in the gas to be treated. It may be of the construction as given or of any other suitable form. The determination may be carried out by means of decinormal iodin solution according to the method of Reich, as described on pages 324 to 329 of Lunge's *Sulphuric Acid and Alkali*, (second edition, Vol. 1.) This tester consists of a tube $g$, leading to the bottom of a receptacle $g'$, containing a known quantity of iodin in solution. The tube $g^2$ leads from the top of the receptacle $g'$ into the top of the receptacle $g^3$, the bottom of which is connected by the flexible tube $g^4$ with the graduated glass $g^5$, open at the top. The method of operation is obvious and requires no explanation. During the operation of the apparatus it is necessary for the attendant to make frequent observations by the tester G— say at intervals of half an hour—and thus determine the percentage of sulfur dioxid in the gas, because for the proper operation of the apparatus it is necessary that this percentage should be kept as nearly uniform as possible. The best percentage to be maintained will depend upon the conditions—such as temperature, rate of flow of gas, &c.— maintained in the contact-furnace H.

$f^5$ is a valve whereby the volume of gas passing through the pipe $f^2$ may be regulated.

Figures 9, 10, 11, 12:
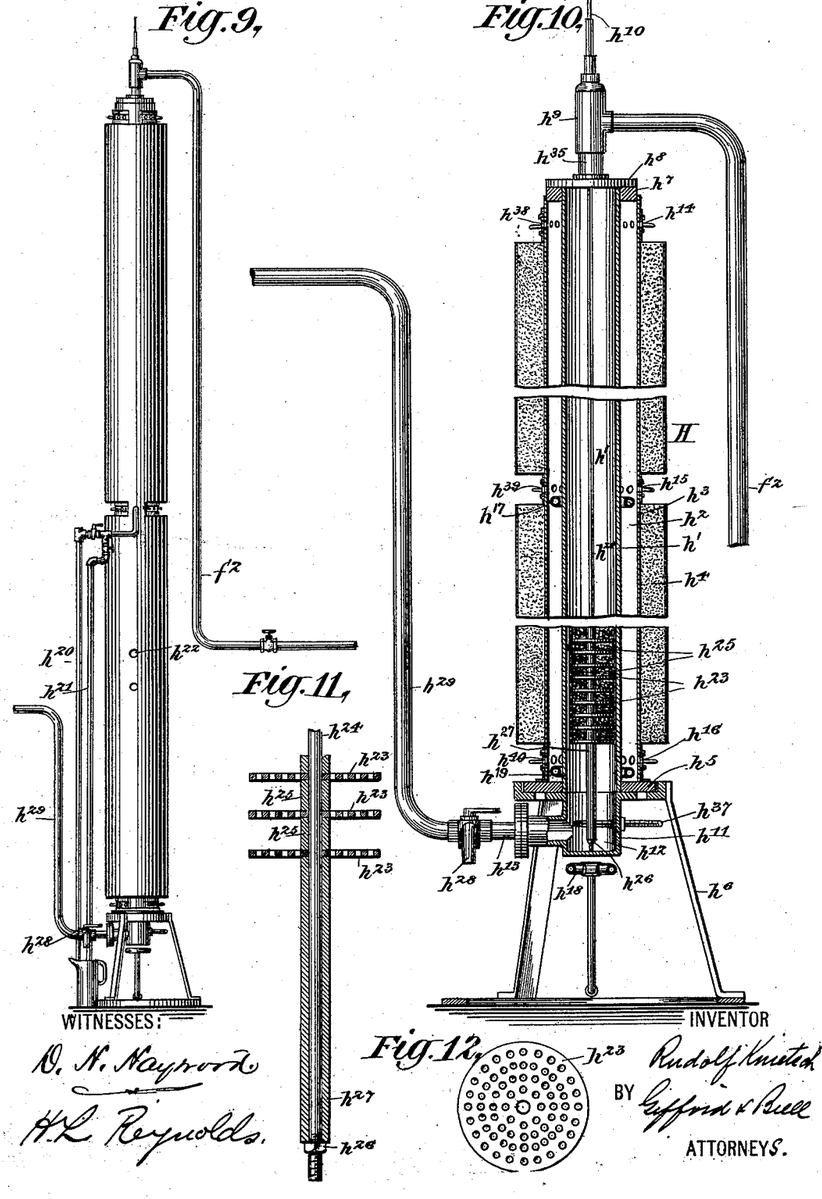
Fig. 9 is an elevation of the contact-furnace employed in Fig. 1.
Fig. 10 is a vertical section of the same.
Figs. 11 and 12 are details of the contact-substance holder.

The contact-furnace H (the interior construction of which is shown to a scale in Fig. 10) consists of a central tubular contact-chamber $h'$, jacketed by an annular passage $h^2$, which is in turn jacketed by insulating material $h^4$. The contact-chamber $h'$ consists of a wrought-iron pipe. At the bottom it extends through the tube-plate $h^5$, which is supported on a stand $h^6$. The top of the contact-tube $h'$ extends through the tube-plate $h^7$ and is provided with a cover $h^8$.

$h^9$ is a nipple connected on one side with the pipe $f^2$ and connected with the cover $h^8$ by the pipe $h^{35}$. Through this nipple a thermometer $h^{10}$ extends, so that its bulb is in the pipe $h^{35}$ and its scale is above the nipple.

$h^{11}$ is a cover fitting the bottom of the tube $h'$. It is provided with a receiving-chamber $h^{12}$, forming a continuation of the contact-chamber, and with one side of which receiving-chamber the pipe $h^{13}$ is connected.

$h^{37}$ is a thermometer having its bulb inside and its scale outside the receiving-chamber $h^{12}$.

The jacketing-passage $h^2$ is formed by a sheet-iron tube $h^3$, preferably concentric with and nearly twice the diameter of the contact-chamber $h'$, extending from the tube-plate $h^5$ to the tube-plate $h^7$. Its walls are pierced near the top, middle, and bottom by three series of port-holes $h^{14}$, $h^{15}$, and $h^{16}$, each series extending almost all the way around its circumference and each series being provided with two independent semicircular covers governing separate halves of the series, the covers for each series being, respectively, lettered $h^{38}$, $h^{39}$, and $h^{40}$, by which the ports can be partially or wholly closed. The insulating material $h^4$ is so arranged as to thoroughly protect the apparatus between the series of port-holes from heat radiation.

$h^{17}$ is an annular gas-burner located about midway of the passage $h^2$ and surrounding the contact-chamber $h'$, just below the ports $h^{15}$.

$h^{18}$ is a gas-burner located beneath the receiving-chamber $h^{12}$.

$h^{19}$ is an annular gas-burner which may be employed at the bottom of the annular passage $h^2$ around the contact-chamber $h'$.

The gas-burners $h^{17}$, $h^{18}$, and $h^{19}$ are all supplied with a regulatable supply of illuminating or fuel gas and air under pressure from the gas-supply pipe $h^{20}$ and the air-supply pipe $h^{21}$.

Mica-covered peek-holes $h^{22}$ may be provided for observing the color of the contact-chamber $h'$ around the contact material, although this color may sometimes be observed by looking down through openings at the top of the passage $h^2$.

The contact-material holder consists of a series of perforated wrought-iron plates $h^{23}$, strung upon the rod $h^{24}$, the bottom of which rod rests on the bottom of the receiving-chamber $h^{12}$. The rod extends to the top of the contact-chamber $h'$, so that by the removal of the top cover $h^8$ it can be withdrawn. The plates $h^{23}$ are distanced from each other by intermediate sections of piping $h^{25}$, strung upon said rod, and the bottom plate is distanced from the nut $h^{26}$ on the bottom of the rod by the section of piping $h^{27}$. In charging the contact-chamber with contact material the attendant inserts the rod $h^{24}$ into the contact-chamber from the top, then drops the piping-section $h^{27}$ down said rod, then a perforated plate $h^{23}$, and then scatters a determined quantity of contact material around the rod at the top, so that it falls upon the plate near the bottom more or less distributed around the rod. He then drops one of the piping-sections $h^{25}$ in position, then another perforated plate $h^{23}$, giving the rod a rapid lateral motion to insure even distribution of the contact material, and then more contact material, repeating the operation until the plates and contact material extend about one-third the length of the contact-chamber. For a contact-chamber four inches in diameter by twelve feet in length the perforated plates $h^{23}$ are spaced about one inch apart, and about ten grams of approximately ten per cent. platinized asbestos are placed on each plate, the lower plate being located about nine inches from the bottom of the bottom cover $h^{11}$ and the upper plate about five and one-fourth feet therefrom. By the arrangement of the contact material on the perforated plates, each of which is supported independently of the contact material, the pressure of the layer of contact material on one plate is not borne by the other layers of contact material. Nevertheless the gas has no other course to pass any plate than through the contact material which it carries. By thus dividing the contact material into a plurality of layers and supporting each layer independently of the others the gas passes more readily through the same, and the force required for propelling the gas through the contact material is reduced to a minimum, and the process may thus be conducted at or about atmospheric pressure.

$h^{28}$ is a faucet from which may be drawn off any liquid that may deposit at the bottom of the apparatus. It is well to give this faucet a slight downward inclination. After leaving the faucet $h^{28}$ the pipe $h^{29}$ is extended upward, so as to give the gas a chance to drop any suspended liquid.

$h^{36}$ is an induction-distributer for the $SO_2$.

The first absorber I consists of a wrought-iron inclosure $i$, from the top of which is suspended a wrought-iron hood $i'$, the lower edge of which is serrated. The pipe $h^{29}$ is connected with the top of the hood. The exit-pipe $i^2$ leads from the top of the inclosure $i$. The inclosure $i$ is supplied with sulfuric acid of 66° Baumé through the stand-pipe $i^3$, extending to near the bottom of the inclosure, the level of the sulfuric acid within the inclosure $i$ being kept above the teeth of the hood.

$i^4$ is a faucet through which the fuming sulfuric acid may from time to time be drawn off.

$i^5$ is a water-tank in which the absorber I is immersed for cooling and through which a current of water is passed from the pipe $i^7$ to the pipe $i^6$.

$i^8$ and $i^9$ are pressure-gages connected, respectively, with the inlet-pipe $h^{29}$ and the outlet-pipe $i^2$. The outlet-tube $i^2$ should be wholly or partially of larger diameter, as at $i^{10}$, so that the gas passing away from the receptacle $i$ will have a chance to deposit any liquid that it may contain, which will run back into the receptacle $i$.

$i^{11}$ is a thermometer for determining the temperature in $i$ and which is best kept below 60° centigrade—in the vicinity of 40° centigrade.

The second absorber J is of the same construction as the first absorber I, excepting that its material is of cast-iron. A detailed description of it is therefore unnecessary.

$j^{12}$ is a stop-cock.

The tester K is a duplicate of the tester G, already described, excepting that the tester K is larger, by reason of the fact that the gas to be tested is weaker in sulfur dioxid.

In the operation of the apparatus the attendant may proceed as follows: He first charges the contact-chamber, as already described. He then charges the absorbers I and J, respectively, with sulfuric acid of about 66° Baumé and 58° Baumé, or he may charge both with 66° acid, using 58° acid to replenish the second absorber. He next charges the washer E with sulfuric acid of about 66° Baumé. He then brings the contact-chamber to a temperature suitable to the gas to be operated upon, as follows: He first opens the top port-holes $h^{14}$ and then lights the gas-burner $h^{17}$ and turns the air-pressure on the flame until he gets a blue flame. He then closes the middle port-holes $h^{15}$. He then lights the burners $h^{19}$ and turns the air-pressure on the flame until he gets a blue flame. He then closes the bottom port-holes $h^{16}$. He allows the apparatus to continue in this condition about half an hour. He then opens the port-holes $h^{16}$ and $h^{15}$ about one-eighth of their capacity. When his thermometer $h^{10}$ registers about 150° centigrade, he lights the burners $h^{18}$ and turns air-pressure on the flame sufficient to make a blue flame until the thermometer $h^{14}$ shows a temperature of about 240° centigrade. He then turns on the sulfur dioxid at A and starts the air-pump D. As soon as in his judgment a sufficient time has elapsed for a representative mixture of air and sulfur dioxid to reach the pipe $f^2$ he makes a test with the apparatus G, and he then regulates the apparatus back of the pipe $f^2$ so as to continually produce the satisfactory percentage of sulfur dioxid. He then by frequent tests with apparatus K and apparatus G determines the efficiency of the apparatus and by regulating the temperature in the contact-furnace and the percentage of sulfur dioxid and the rate of flow of the gas keeps the efficiency as high as practicable.

While the apparatus is running the gas-burners and port-holes may with advantage be so regulated that the temperature of the contact-chamber $h'$ is maintained so that its walls present a dull-red color opposite the upper portion of the contact material. Since the reaction taking place in the contact material is productive of a higher temperature than this, the proper temperature is maintained by the cooling effect of the draft of air passing upward through the passage $h^2$ from the port-holes $h^{16}$. If the temperature be allowed to fall so low that the walls of the contact-chamber cease to show any redness, or if it be allowed to rise so high that the walls of the contact-chamber show a bright-red or higher heat, in either case there may be a loss in efficiency depending upon the rate of flow of air through the air-cooler space, the richness of the gas treated in sulfur dioxid, its rate of flow, &c. In actual practice when I maintained a temperature not much above 88° centigrade at the thermometer $h^{10}$ and of about 270° centigrade at the thermometer $h^{14}$ I accomplished an average conversion of 95.9% while making sulfuric anhydrid at the rate of 56.4 Ko. in twenty-four hours, with gas of an average composition of about 11.5% sulfur dioxid.

Figure 7:
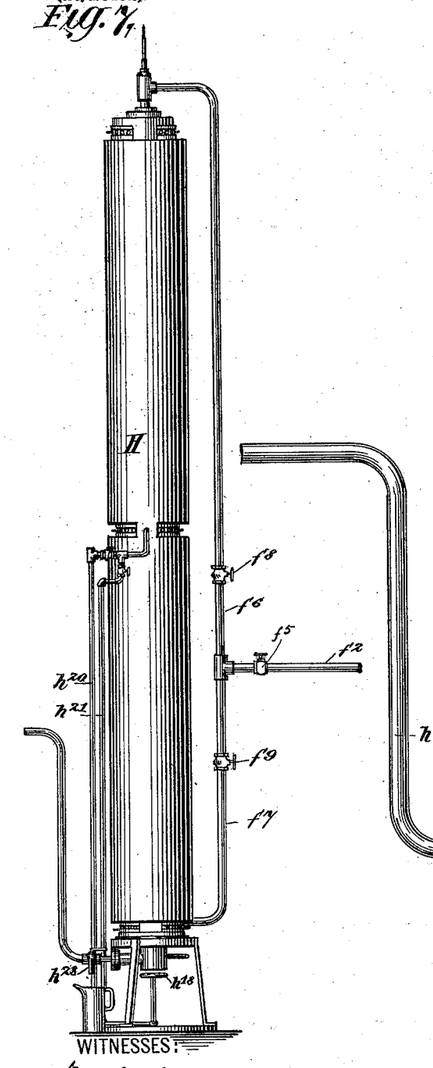
Fig. 7 is an elevation of the contact-furnace employed in Fig. 2.
Figure 8:
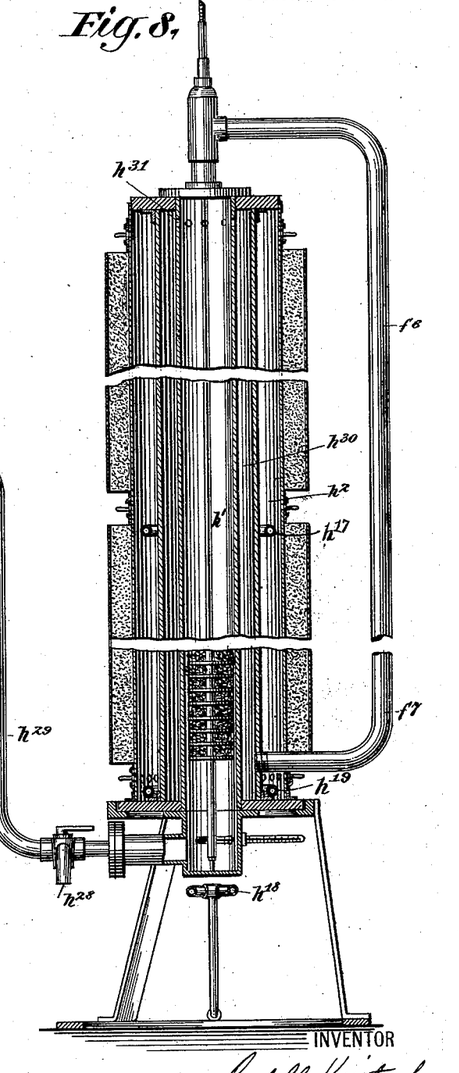
Fig. 8 is a vertical section of the same.

In the modified form of contact-furnace shown in Figs. 7 and 8 an annular passage $h^{30}$ is interposed between the contact-chamber $h'$ and the annular passage $h^2$. The pipe $f^2$, in addition to having a connection $f^6$ with the top of the contact-chamber $h'$, has a branch $f^7$ leading to the bottom of the passage $h^{30}$. The branches $f^6$ and $f^7$ are each controlled by a valve $f^8$ and $f^9$. The passage $h^{30}$ communicates with the top of the contact-chamber $h'$ through a circumferential series of openings $h^{31}$ through the walls of the contact-chamber $h'$. In this form of the apparatus when the operation is started the valves $f^8$ and $f^9$ are closed, the temperature being regulated solely by the air-current in the passage $h^2$ and the gas-burners $h^{17}$ and $h^{19}$. After the apparatus has attained a temperature at thermometer $h^{10}$ of about 100° the gas-flames at $h^{13}$ are lighted and air turned on to give a blue flame until the thermometer at $h^{14}$ shows a temperature of about 240° centigrade. The valve $f^8$ remains closed and the valve $f^9$ opened, so that thereafter the cooling is accomplished by the passage of the gas containing sulfur dioxid and air through the passage $h^{30}$ on its way to the top of the contact-chamber $h'$, which it enters through the openings $h^{31}$. Depending upon the richness in sulfur dioxid of the gases operated upon, part of the gas to be treated passes through the cooling-space and the rest passes directly into the contact-chamber $h'$ by opening valve $f^8$. In this modified form of apparatus no means are provided for observing the color of the walls of the contact-chamber opposite the contact material; but such means are not essential, because by his analyses at G and K the attendant determines whether the proper conditions of temperature exist and regulates the heat-supply of the furnace accordingly by observations on the thermometers $h^{10}$ and $h^{14}$. In actual practice I attained an average conversion of 96.6% when the thermometer $h^{10}$ indicated a temperature not far from 200° centigrade and thermometer $h^{14}$ of about 195° centigrade.

I have described two forms of contact-chamber cooler, each being provided with competent means of regulation whereby the cooling action may be kept within such bounds as will maintain the contents of the contact-chamber at a temperature between the composing and decomposing temperature of the sulfuric anhydrid being formed, so as to enable the sulfur dioxid contained in pyrites, gases, or other source of sulfur dioxid to be converted almost quantitatively into anhydrid. I do not wish to be understood, however, as limiting myself to either of the shown forms of contact-chamber cooler or means of regulation of the cooling capacity thereof.

I claim—

1. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium, an apparatus whereby the gases to be treated are purified, an apparatus whereby the percentage of sulfur dioxid in the gases to be treated may be determined, an apparatus whereby the sulfuric anhydrid may be absorbed from the gases after leaving the contact material and an apparatus whereby the percentage of sulfur dioxid in the gases passing beyond said absorbing apparatus may be determined.

2. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium, an apparatus whereby the percentage of sulfur dioxid in the gas-supply may be determined, a thermometer in the path of said gas-supply to the contact material, a thermometer in the path of the gases leaving said contact material and an apparatus for determining the percentage of sulfur dioxid in the waste gases.

3. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium, a thermometer in the path of the gas-supply on its way to the contact material, a thermometer in the path of the sulfuric anhydrid on its way from the contact material, an apparatus whereby the sulfuric anhydrid may be absorbed from the gases after leaving the contact material and an apparatus whereby the percentage of sulfur dioxid in the gases passing beyond said absorbing apparatus may be determined.

4. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium; said combination being provided with an observation-opening through which the color of said contact-material receptacle due to the temperature therein may be observed.

5. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium, a contact-material holder consisting of a series of diaphragms which are supported independently of the contact material.

6. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium consisting of means whereby both the volume and temperature of the cooling medium are regulated, and means whereby the richness of said gases in sulfur dioxid may be regulated.

7. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium and means whereby both the rate of flow of the gases through the contact-material receptacle and the richness of said gases in sulfur dioxid may be regulated.

8. In an apparatus for manufacturing sulfuric anhydrid by the contact process, in combination, a receptacle for the contact material, a holder whereby a cooling medium is held in heat-extracting proximity to said contact material, means for regulating the cooling capacity of said cooling medium, and means whereby the richness of said gases in sulfur dioxid may be regulated.

9. In an apparatus for manufacturing sulfuric anhydrid by the contact process, in combination, a contact-material receptacle consisting of a wrought-iron pipe $h'$, a contact-material supporter therein, a holder whereby a cooling medium is conducted in contact with the outside of said wrought-iron pipe and means whereby the cooling capacity of said cooling medium is regulated.

10. In an apparatus for manufacturing sulfuric anhydrid by the contact process, in combination, a receptacle for the contact material, a holder for a cooling medium surrounding said receptacle having top and bottom ports and means for closing said ports.

11. In an apparatus for the manufacture of sulfuric anhydrid, in combination, the chamber $h'$, contact material occupying the egress portion of said chamber, the inclosure $h^3$ surrounding said chamber and provided with ports at the top, bottom and middle.

12. In an apparatus for manufacturing sulfuric anhydrid by the contact process, in combination, a chamber $h'$, contact material occupying the egress portion thereof, an inclosure $h^3$ surrounding said chamber, insulating material surrounding said inclosure and ports extending through said inclosure; said insulating material being omitted over said ports.

13. In an apparatus for manufacturing sulfuric anhydrid by the contact process, in combination, the chamber $h'$, the contact material occupying one end thereof, the inclosure $h^3$, the burners $h^{17}$ and $h^{19}$ and the ports $h^{14}$, $h^{15}$, and $h^{16}$.

14. In an apparatus for the manufacture of sulfuric anhydrid by the contact process, in combination, the chamber $h'$, the contact material, the receiving-chamber $h^{12}$ at the exit end thereof, the burner $h^{18}$, the inclosure $h^3$, the burners $h^{17}$ and $h^{19}$ and the ports $h^{14}$, $h^{15}$ and $h^{16}$.

15. In an apparatus for the manufacture of sulfuric anhydrid by the contact process, in combination, the chamber $h'$, the series of contact-material supports $h^{23}$ therein, the inclosure $h^3$, the ports through said inclosure near the top and bottom of said series of contact-material supports and means whereby said ports may be regulated.

16. In an apparatus for the manufacture of sulfuric anhydrid by the contact process, in combination, the chamber $h'$, the inclosure $h^3$, the intermediate chamber $h^{30}$, the passage $f^7$ leading into said chamber, $h^{30}$, ports $h^{31}$ leading into said chamber $h'$, the valve $f^9$ whereby said passage $f^7$ is controlled, ports leading into and out of said inclosure $h^3$, and means whereby said ports are controlled.

In testimony whereof I have hereunto set my hand in the presence of two subscribing witnesses.

RUDOLF KNIETSCH.

Witnesses:
ERNEST E. EHRHARDT,
BERNHARD C. HESSE.